US012080010B2

(12) United States Patent
Watson et al.

(10) Patent No.: US 12,080,010 B2
(45) Date of Patent: Sep. 3, 2024

(54) SELF-SUPERVISED MULTI-FRAME MONOCULAR DEPTH ESTIMATION MODEL

(71) Applicant: Niantic, Inc., San Francisco, CA (US)

(72) Inventors: James Watson, London (GB); Oisin MacAodha, Edinburgh (GB); Victor Adrian Prisacariu, London (GB); Gabriel J. Brostow, London (GB); Michael David Firman, London (GB)

(73) Assignee: NIANTIC, INC., San Francisco, CA (US)

( * ) Notice: Subject to any disclaimer, the term of this patent is extended or adjusted under 35 U.S.C. 154(b) by 0 days.

(21) Appl. No.: 17/545,201

(22) Filed: Dec. 8, 2021

(65) Prior Publication Data

US 2022/0189049 A1 Jun. 16, 2022

Related U.S. Application Data

(60) Provisional application No. 63/124,757, filed on Dec. 12, 2020.

(51) Int. Cl.
*G06T 7/55* (2017.01)
*G01B 11/22* (2006.01)
(Continued)

(52) U.S. Cl.
CPC ............... *G06T 7/55* (2017.01); *G01B 11/22* (2013.01); *G06T 3/18* (2024.01); *G06T 7/73* (2017.01);
(Continued)

(58) Field of Classification Search
CPC ........... G06T 7/55; G06T 7/73; G06T 3/0093; G06T 11/00; G06T 2207/10016;
(Continued)

(56) References Cited

U.S. PATENT DOCUMENTS 10,621,783 B2    4/2020  Park et al.
11,429,805 B2 *  8/2022  Ren ..................... G06T 7/593
(Continued)

FOREIGN PATENT DOCUMENTS

TW        202004670 A      1/2020
TW        202041850 A     11/2021
WO   WO 2017/215899 A2    12/2017

OTHER PUBLICATIONS

A. Ranjan et al., "Competitive Collaboration: Joint Unsupervised Learning of Depth, Camera Motion, Optical Flow and Motion Segmentation," 2019 IEEE/CVF Conference on Computer Vision and Pattern Recognition (CVPR), 2019, p. 12232-12241, doi: 10.1109/CVPR.2019.01252. (Year: 2019).*

(Continued)

*Primary Examiner* — Yu Chen
(74) *Attorney, Agent, or Firm* — FENWICK & WEST LLP (57) ABSTRACT

A multi-frame depth estimation model is disclosed. The model is trained and configured to receive an input image and an additional image. The model outputs a depth map for the input image based on the input image and the additional image. The model may extract a feature map for the input image and an additional feature map for the additional image. For each of a plurality of depth planes, the model warps the feature map to the depth plane based on relative pose between the input image and the additional image, the depth plane, and camera intrinsics. The model builds a cost volume from the warped feature maps for the plurality of depth planes. A decoder of the model inputs the cost volume and the input image to output the depth map.

14 Claims, 7 Drawing Sheets

(51) Int. Cl.
*G06T 3/18* (2024.01)
*G06T 7/73* (2017.01)
*G06T 11/00* (2006.01)

(52) U.S. Cl.
CPC .... *G06T 11/00* (2013.01); *G06T 2207/10016* (2013.01); *G06T 2207/20081* (2013.01); *G06T 2207/20084* (2013.01)

(58) Field of Classification Search
CPC ........... G06T 2207/20081; G06T 2207/20084; G01B 11/22
See application file for complete search history.

(56) References Cited

U.S. PATENT DOCUMENTS

| | | | | |
|---|---|---|---|---|
| 2019/0139179 | A1* | 5/2019 | Wang | G06T 7/50 |
| 2019/0213481 | A1* | 7/2019 | Godard | G06T 7/593 |
| 2019/0295282 | A1* | 9/2019 | Smolyanskiy | G06F 18/22 |
| 2019/0356905 | A1* | 11/2019 | Godard | G06T 7/73 |
| 2020/0160546 | A1* | 5/2020 | Gu | G06T 3/0093 |
| 2020/0226722 | A1 | 7/2020 | Pandey | |
| 2022/0026918 | A1* | 1/2022 | Guizilini | G05D 1/0246 |
| 2022/0063605 | A1* | 3/2022 | Ji | G06T 7/73 |
| 2022/0084230 | A1* | 3/2022 | Guizilini | G06T 7/55 |
| 2022/0319029 | A1* | 10/2022 | Pallotti | G06T 7/593 |
| 2022/0391632 | A1* | 12/2022 | Ren | G06N 3/0454 |

OTHER PUBLICATIONS

Sun, Deqing, et al. "Pwc-net: Cnns for optical flow using pyramid, warping, and cost volume." Proceedings of the IEEE conference on computer vision and pattern recognition. 2018. (Year: 2018).*

PCT International Search Report and Written Opinion, PCT Application No. PCT/IB2021/061433, Mar. 4, 2022, nine pages.

Ranjan, A. et al., "Adversarial Collaboration: Joint Unsupervised Learning of Depth, Camera Motion, Optical Flow and Motion Segmentation," arXiv:1805.09806v1, May 24, 2018, pp. 1-16.

Watson, J. et al., "The Temporal Opportunist: Self-Supervised Multi-Frame Monocular Depth," arXiv:2104.14540v2, Jul. 14, 2021, pp. 1-19.

Taiwan Patent Office, Office Action, Taiwanese Patent Application No. 110145947, Jan. 6, 2023, 15 pages.

* cited by examiner

SELF-SUPERVISED MULTI-FRAME MONOCULAR DEPTH ESTIMATION MODEL

CROSS REFERENCE TO RELATED APPLICATIONS

This application claims priority to U.S. Provisional Application No. 63/124,757 filed on Dec. 12, 2020, which is also incorporated by reference.

BACKGROUND

1. Technical Field

The subject matter described generally relates to estimating a depth map for input images, and in particular to a machine-learned model for estimating the depth map that uses multiple frames from a monocular video.

2. Problem

Depth sensing has applications in both navigation and scene understanding. Many methods use trained models or networks to determine a depth map from a single-color input image. There are a few methods that use different kinds of training data for training the depth estimation system. For example, a depth estimation system may be trained using a detection and ranging system to establish a ground truth depth for objects in an environment (e.g., radio detecting and ranging (RADAR), light detection and ranging (LIDAR), etc.) paired with images taken of the same scene by a camera. Although detection and ranging systems can provide a ground truth of depth of objects, constantly utilizing detection and ranging systems to sense depth of many different environments can be a costly endeavor in time and resources. Moreover, detection and ranging systems are unable to determine depths for some objects that with material properties (e.g., reflective objects) that render them undetectable by the detection and ranging systems.

SUMMARY

Self-supervised monocular depth estimation networks may be trained to predict scene depth using nearby training-time frames as a supervision signal. However, for many applications, sequence information in the form of video frames is also available at test time. Many monocular depth estimation networks do not make use of this extra signal, thus ignoring valuable information that could be used to improve the predicted depth. Those that do either use computationally expensive (i.e., impractical) test-time refinement techniques, or use off-the-shelf recurrent networks that only indirectly access the inherently available geometric information and can be computationally demanding during training.

The present disclosure describes training a depth estimation model with a self-supervised approach that uses a time series of images (e.g. frames from a monocular video). When deployed, the model may generate a depth map from a single input image and use additional images in a time series as supplementary input if available. For example, a depth map for a frame in a monocular video may be generated using the frame and a set of N previous frames from the video. The mode may use an adaptive cost volume that indicates the likelihoods of pixels having each of a range of possible depth values between a minimum and maximum value. The depth range is adaptive to address the scale ambiguity that arises from the use of self-supervised training. During training of the model, a secondary depth estimation network that takes a single image input may be used to guide the training process to reduce overfitting. The secondary depth estimation network may share a pose estimation network with the model.

DETAILED DESCRIPTION

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. Wherever practicable similar or like reference numbers are used in the figures to indicate similar or like functionality. Where elements share a common numeral followed by a different letter, the elements are similar or identical. The numeral alone refers to any one or any combination of such elements.

Example Parallel-Reality Game System Using Depth Model

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining depth information from image data is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
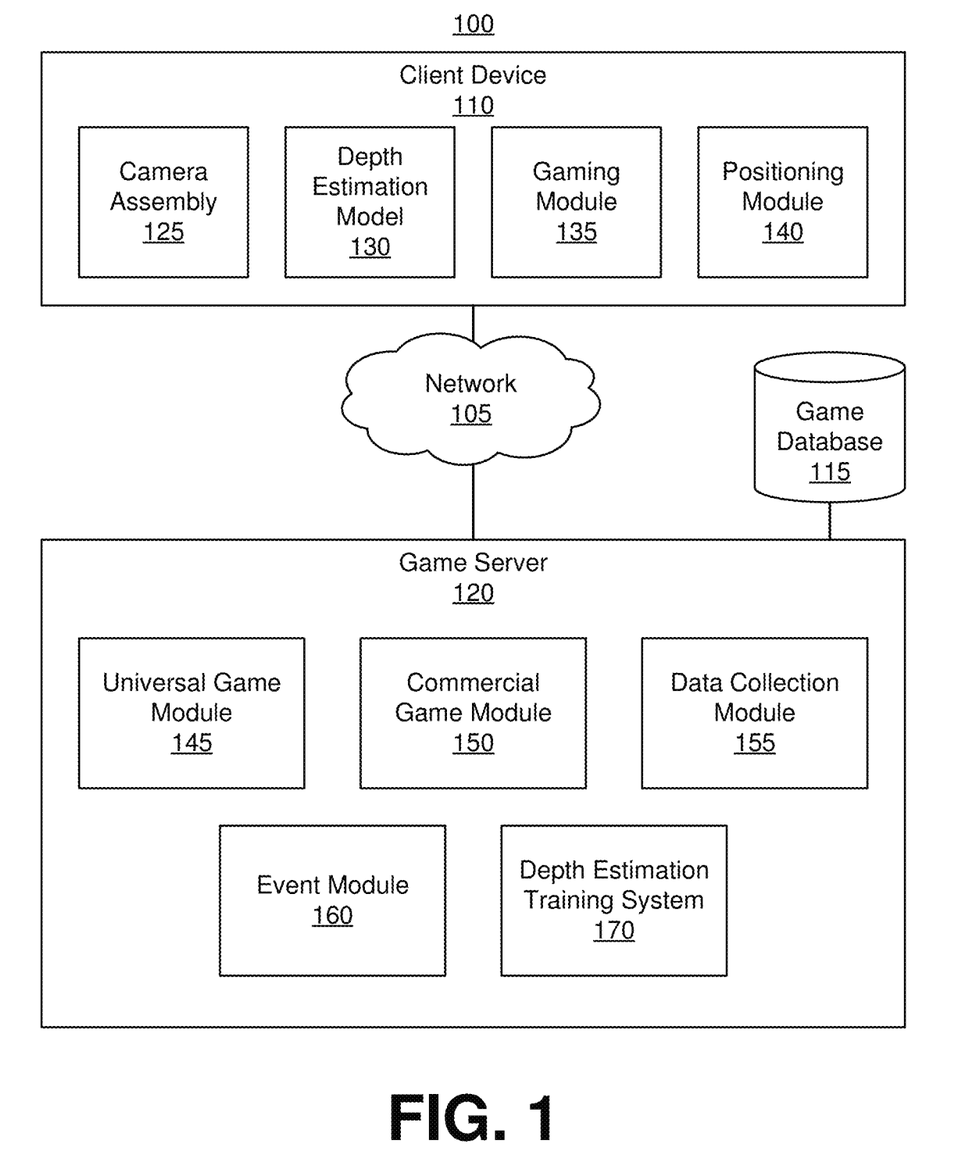
FIG. 1 illustrates a networked computing environment, in accordance with one or more embodiments.

FIG. 1 illustrates one embodiment of a networked computing environment 100. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 120 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 120.

In the embodiment shown in FIG. 1, the networked computing environment 100 uses a client-server architecture, with a game server 120 that communicates with a client device 110 over a network 105 to provide a parallel reality game to a player at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that may be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 is a conventional computer system, such as a desktop or a laptop computer. Still yet, the client device 110 may be a vehicle with a computing device. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. In on embodiment, the client device 110 includes a camera assembly 125 that captures image data in two dimensions of a scene in the physical environment around the client device 110. The client device 110 also includes a depth estimation model 130, a gaming module 135, and a positioning module 140. The client device 110 may include various other software modules or input/output devices for receiving information from or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment around the client device 110. The camera assembly 125 may utilize a variety photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 comprises one camera and is configured to capture monocular image data. In various other implementations, the camera assembly 125 comprises a plurality of cameras each configured to capture image data.

The depth estimation model 130 receives an input image of a scene. The depth estimation model 130 may also receive one or more additional images of the scene that have a close temporal relationship to the input image (e.g., the frames of a monocular video from which the input image is taken that immediately precede the input image). The depth estimation model 130 outputs a depth map of the scene based on the input image. In embodiments where the additional temporal images are available, the depth estimation model 130 may output the depth map further based on the additional images. The depth estimation model 130 may be trained by a depth estimation training system 170 and can be updated or adjusted by the depth estimation training system 170, which is discussed in greater detail below.

The received input image may be captured by a camera of the camera assembly 125 or another camera from another client device 110. In some embodiments, some or all of the received input image and additional images have appended metadata specifying intrinsics of the camera. The intrinsics may include one or more geometric properties of the camera at a time when the image was captured, e.g., the focal length of the camera when capturing the image, the camera's principal point offset, the skew of the camera, etc. With the intrinsics, the depth estimation model 130 may generate an intrinsic matrix accounting for the intrinsics. In some embodiments, the depth estimation model 130 determines whether images are satisfactory, e.g., above a threshold resolution. If not, the depth estimation model 130 may perform one or more pre-processing techniques to ensure the images are satisfactory, e.g., upsample the images in question to a desired resolution prior to determining the depth map of the scene. Other example conditions include adjusting an exposure, a contrast, a grain, a color scale, or other characteristic of the image, etc.

The depth estimation model 130 is implemented with one or more machine learning algorithms. Machine learning algorithms that may be used for the depth estimation model 130 include neural networks, decision trees, random forest, regressors, clustering, other derivative algorithms thereof, or some combination thereof. In one or more embodiments, the depth estimation model 130 is structured as a neural network comprising a plurality of layers including at least an input layer configured to receive the input image (and additional images where available) and an output layer configured to output the depth prediction. Each layer comprises a multitude of nodes, each node defined by a weighted combination of one or more nodes in a prior layer. The weights defining nodes subsequent to the input layer are determined during training by the depth estimation training system 170. In one example architecture, the depth estimation model 130 may comprise a first set of layers termed a pose network configured to determine the pose of the camera when the input image and any additional images were captured (may be an absolute pose from a fixed coordinate system or a relative pose defined in relation between a pair of images) and a second set of layers termed a depth network configured to determine a depth map of the same dimensionality of the input image.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a user to interact in the virtual world to perform various game objectives. In some other embodiments, the gaming module 135 presents image data from the real world (e.g., captured by the camera assembly 125) augmented with virtual elements from the parallel reality game. In these embodiments, the gaming module 135 may generate virtual content or adjust virtual content according to other information received from other components of the client device 110. For example, the gaming module 135 may adjust a virtual object to be displayed on the user interface according to a depth map (e.g., determined by the depth estimation model 130) of the scene captured in the image data.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate or adjust game content to be displayed by the client device 110. For example, the gaming module 135 may generate a virtual element based on depth information (e.g., as determined by the depth estimation model 130).

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 140 may further include various other sensors that may aid in accurately positioning the client device 110 location.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 120 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, and a depth estimation training system 170. As mentioned above, the game server 120 interacts with a game database 115 that may be part of the game server 120 or accessed remotely (e.g., the game database 115 may be a distributed database accessed via the network 105). In other embodiments, the game server 120 contains different or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The depth estimation training system 170 trains a depth estimation model, e.g., the depth estimation model 130 provided to the client device 110. The depth estimation training system 170 receives sets of images for use in training the depth estimation model. Each set includes a time-series of images. In one embodiment, the time-series of images is frames from a monocular video, i.e., video captured by a single camera as opposed to binocular referring to two camera systems. In estimating the depth map for a particular image, the depth estimation training system 170 uses images from both before and after the particular image in the time-series. In contrast, when the model is deployed, it may consider images from before a particular image when determining a depth map to enable online applications.

Generally, for a given set of images, the depth estimation training system 170 performs any desired preprocessing, inputs the set into the depth estimation model to generate a depth prediction, generates one or more synthesized images from one or more nearby images (e.g., adjacent frames in the video) using predicted depth maps, calculates a loss based on a loss function determined from differences between the original images and the synthesized images, and iteratively adjusts parameters of the depth estimation model to minimize the loss. The general process above describes a self-supervising training algorithm. Generally, the self-supervised training does not require ground truth depth for training as would generally be required for supervised training algorithms. The depth estimation system 170 trains the model in part based on a cost volume that measures the geometric compatibility between one image and nearby images (e.g., a frame from a video and N frames before and after that frame in the video).

The depth estimation training system 170 trains the depth estimation model 130 by minimizing the overall loss. The depth estimation training system 170 trains through adjusting parameters of the depth estimation model 130 to minimize the overall loss of each training image pair. A training image pair may refer to a synthesized image generated from a first training image and a second training image that is temporally adjacent to the first image pair. In one embodiment, the depth estimation training system 170 backpropagates through the depth estimation model 130, adjusting parameters of the depth estimation model 130 to minimize the overall loss. The depth estimation training system 170 may perform iterative batch training, e.g., training the depth estimation model 130 batch-by-batch of training image pairs. A number of epochs for training determines a number of instances of feeding the training image data through the depth estimation model 130 forward and backward. Upon conclusion of training, the depth estimation training system 170 may validate the depth estimation model 130 with a set of training image data with ground truth depth data to determine an accuracy of the trained depth estimation model 130.

In various embodiments, the cost volume is adaptive. In particular, the minimum and maximum distances (i.e., depths) that define the cost volume are parameters that are learned during training. Cost volumes benefit from allowing the depth estimation model to leverage inputs from multiple viewing angles (e.g., the additional images derived from the monocular video). The minimum and maximum depths are typically hyperparameters that may be set assuming a static real-world environment. In some embodiments the minimum and maximum depths are tuned during the training.

In other various embodiments, pixels unreliable for depth prediction are filtered out from the additional images. In these embodiments, a secondary depth network is used to aid training. The secondary network takes single images rather than a time-series of images as input and outputs estimated depth maps. The secondary depth network may share a pose network with the depth estimation model being trained to provide consistency. The secondary depth network is used to identify pixels for which the depth values generated by the model being trained are unreliable. For example, moving objects often result in inaccurate depth values from the model being trained because it takes a time-series of images as input, which can result in the model overfitting to artifacts caused by the motion rather than learning to accurately predict the depth of pixels. Similarly, objects with little texture can also produce inaccurate depth values. Pixels for which the model being trained and the secondary depth network generate results that differ by more than a threshold may be flagged as unreliable. For example, the depth estimation training system 170 may generate a binary mask indicating reliable and unreliable pixels, and include a term in the loss function for the unreliable pixels that encourages the model being trained to more closely align with the values generated by the secondary depth network.

In some embodiments, the depth estimation training system 170 accounts for scenarios where there is little to no change between images in a time-series (e.g., video captured by a static camera). The depth estimation training system 170 simulates a static camera by randomly (e.g., with a specified probability) color augmenting a single image to determine the cost volume with the color augmented version. Similarly, to account for deployment situations where only a single input image is provide, randomly selected iterations of the training process may replace the cost volume with all zeroes (or some other constant value), thereby generating a blank cost volume. Thus, in deployment situations where only a single input image is available, a blank cost volume may be input into the model, which has been trained to still produce reasonable depth maps in the absence of the additional images that could be used to generate a cost volume.

The depth estimation training system 170 after training its models with the training images can provide parameters for the depth estimation model 130 to receive a time sequence of input images and generate a depth map for one or more of the images using the parameters learned by the depth estimation training system 170. Note that, although the depth estimation training system 170 is shown as part of the game server 120 for convenience, some or all of the models may be trained by other computing devices and provided to client devices 110 in various ways, including being part of the operating system, included in a gaming application, or accessed in the cloud on demand.

Once the depth estimation model is trained, the depth estimation model receives image data and outputs depth information of the environment based on the image data. The depth estimation training system 170 provides the trained model to the client device 110. The client device 110 uses the trained model to estimate the depth of pixels in images (e.g., captured by a camera on the device). The depth estimates may have various uses, such as aiding in the rendering of virtual content to augment real world imagery, assisting navigation of robots, detecting potential hazards for autonomous vehicles, and the like.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Parallel-Reality Game

Figure 2:
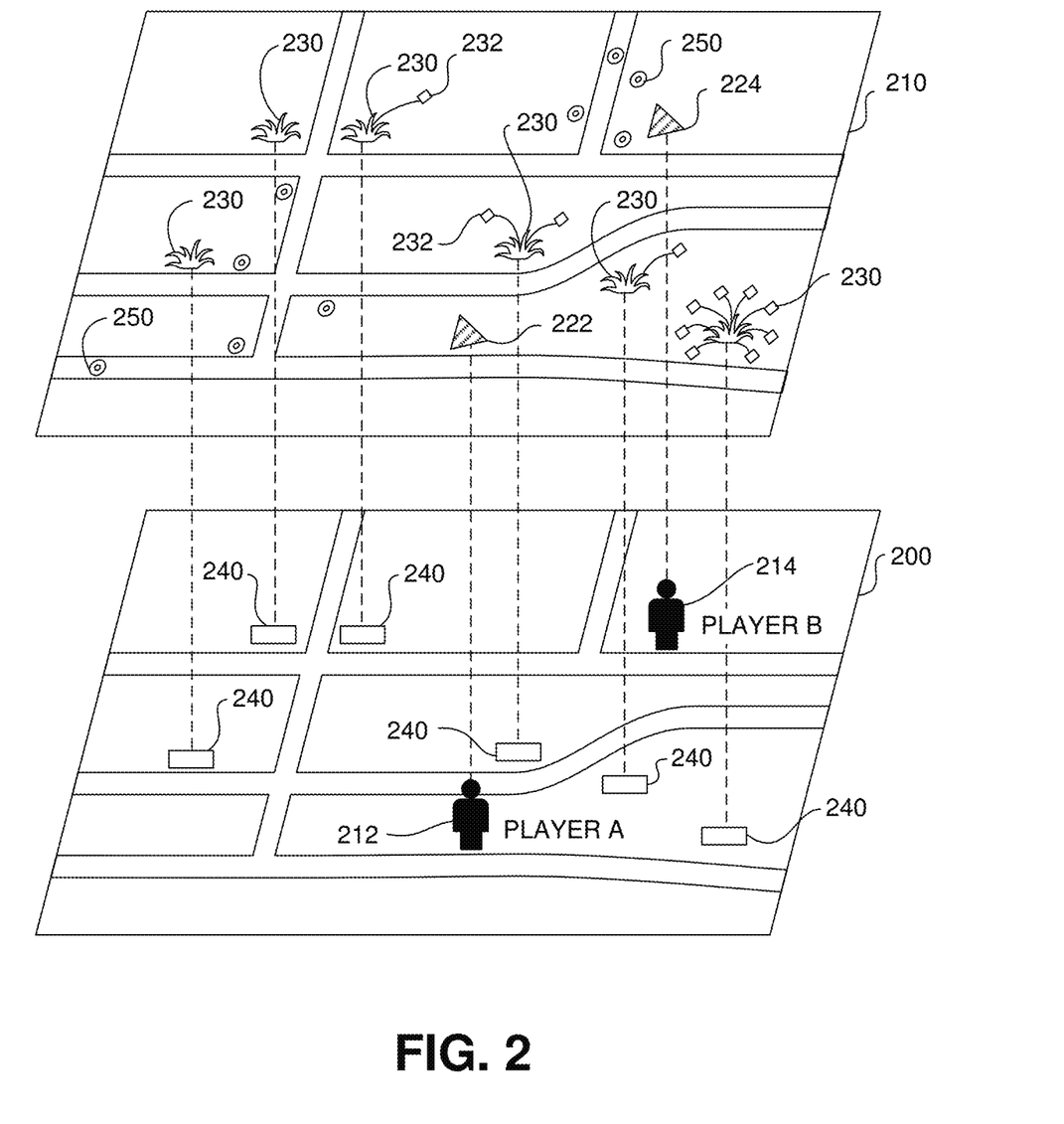
FIG. 2 depicts a representation of a virtual world having a geography that parallels the real world, in accordance with one or more embodiments.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to or interact with various virtual elements or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph or verifying, obtaining, or capturing other information about the landmark or object 240 associated with the virtual element 230.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Figure 3:
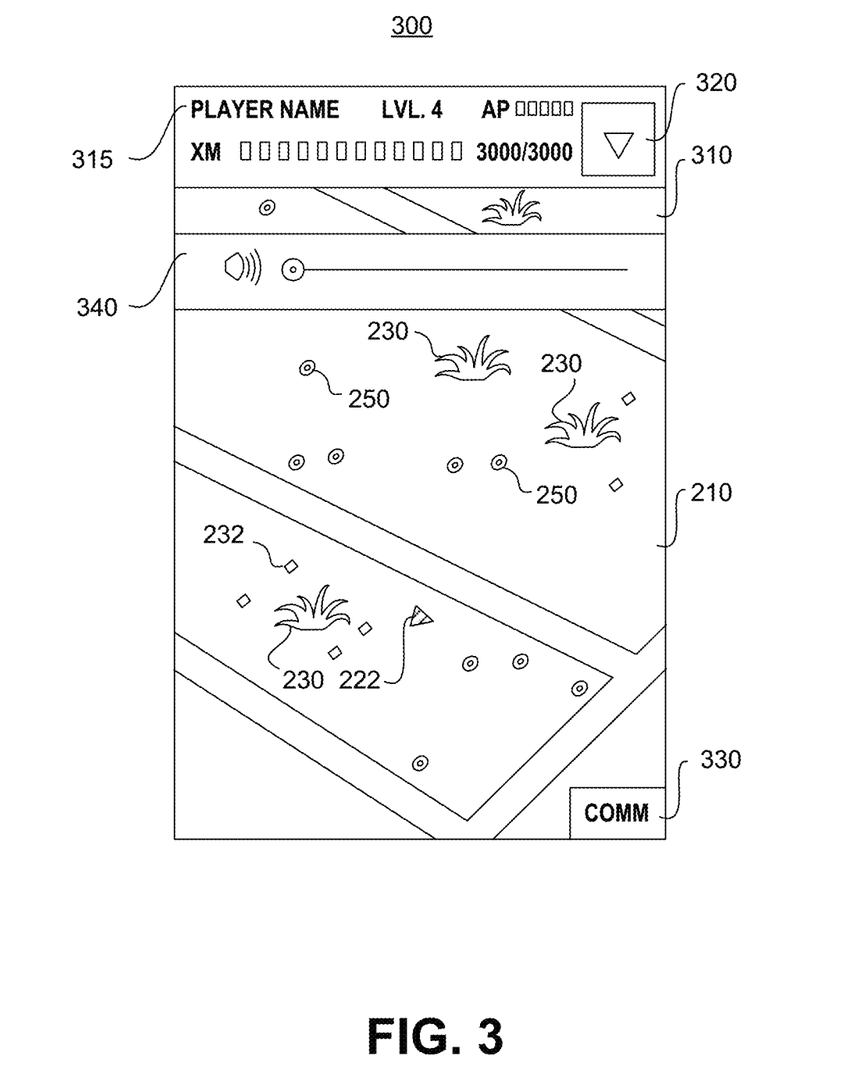
FIG. 3 depicts an exemplary game interface of a parallel reality game, in accordance with one or more embodiments.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 120 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Example Methods

Figure 4:
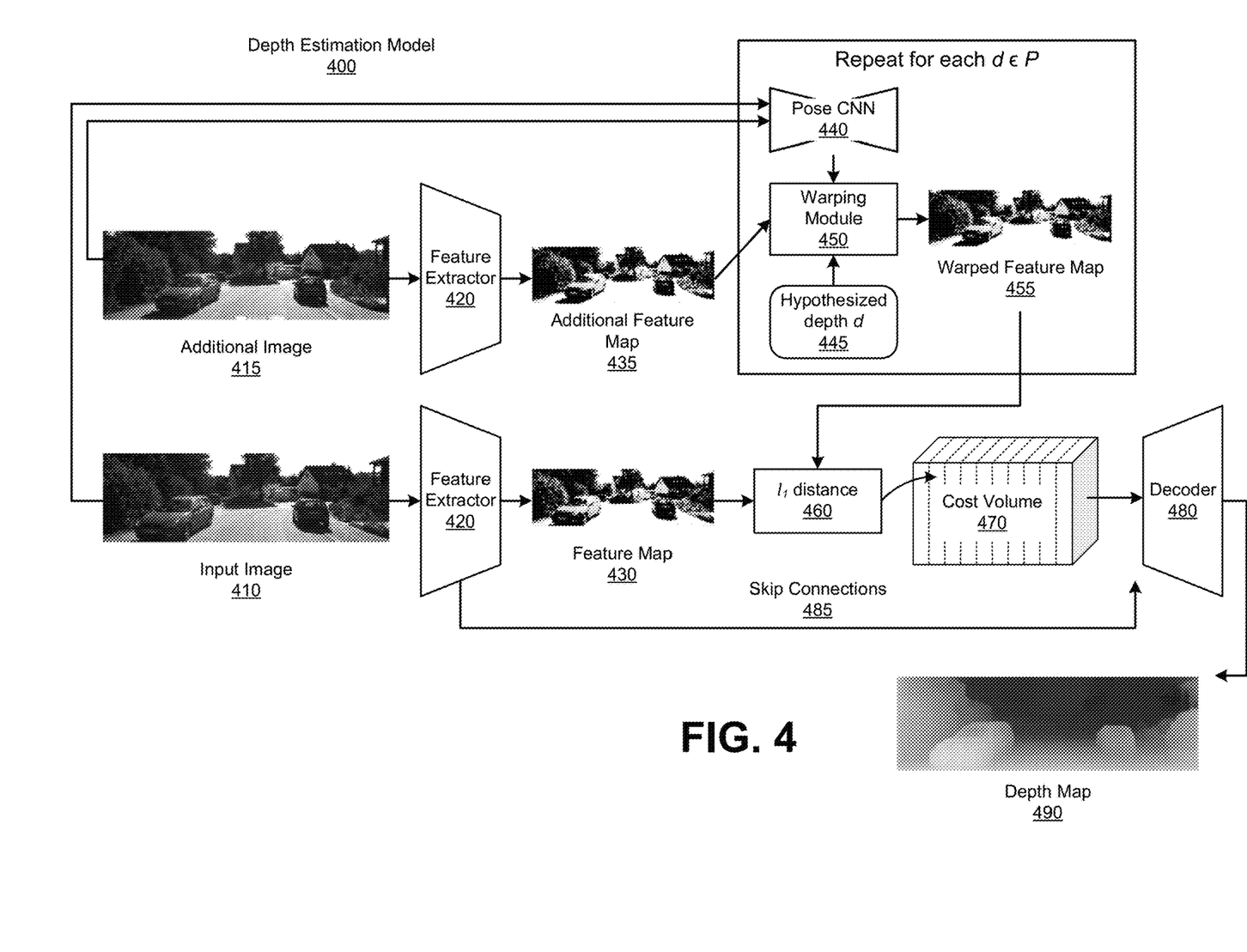
FIG. 4 illustrates a depth estimation model, in accordance with one or more embodiments.

FIG. 4 illustrates an example depth estimation model 400, in accordance with one or more embodiments. The depth estimation model 400 may be trained by the depth estimation training system 170. The description of FIG. 4 illustrates the principle of depth estimation of an input image 410 with a single additional image 415. The principles may be extended to multiple additional images. In other embodiments, the depth estimation model 400 may include additional steps, different steps, or fewer steps as described in this disclosure.

The depth estimation model 400 receives an input image 410 along with an additional image 415 that are temporally adjacent to the input image 410 (e.g., from a monocular video). A feature extractor 420 of the depth estimation model 400 generates a feature map 430 based on the input image 410 and an additional feature map 435 for the additional image 415. The feature extractor 420 may implement one or more computational algorithms to extract features from the input images. Example algorithms for feature extraction may include a convolutional kernel, edge detection algorithms, object detection algorithms, etc. In some embodiments, the feature maps generated by the feature extractor 420 have smaller dimensionality than the input images.

The depth estimation model 400 builds a cost volume 470 based on the additional image 415 to supplement depth estimation for the input image 410. The additional feature map 435 is warped by the warping module 450 to two or more depth planes. To warp the additional feature map 435, the warping module 450 considers a relative pose (between the additional image and the input image 410), one or a plurality of depth planes, and intrinsics of the camera. The relative pose is determined by a pose CNN 440, which may be implemented as a convolutional neural network to determine relative pose based on the additional image 415 and the input image 410. In other embodiments, the relative pose may be determined using a different pose determination methodology, e.g., using a simultaneous localization and mapping (SLAM) algorithm (visual or IMU-based), other pose determination algorithms based on accelerometer data, etc. An ordered set of depth planes P perpendicular to the optical axis of the input image may be determined with hypothesized depths 445 spaced between $d_{min}$ and $d_{max}$. The spacing of the hypothesized depths 445 may be linear or non-linear (e.g., exponential spacing) which can allow for variable granularity of the cost volume at different depths (e.g., closer depths have fine-grained granularity through close spacing and farther depths have large-grained granularity through spread out spacing). In other embodiments, the number of depths and/or planes can be optimized to trade-off computational cost and accuracy of the depth estimation model 400 (e.g., the more depths and/or planes, the higher the computational cost and higher accuracy). The optimization could be accomplished through cross-validation or through Neural Architecture Search.

The additional feature map 435 is warped to create a warped feature map 455, effectively projecting the additional feature map 435 a plurality of depth planes P. A difference (shown as the h distance 460) is taken based on the warped feature map 455 and the feature map 430 and used to build the cost volume 470, concatenating a difference between each warped feature map 455 (for each depth plane d) and the feature map 430. For example, each layer of the cost volume 470 includes the $l_1$ distance between a warped feature map 455 at depth plane d and the feature map 430. The $l_1$ distance is an absolute difference, but other distance metrics may be implemented (e.g., $l_2$ distance, Manhattan distance, Minkowski distance, Hamming distance, etc.). The cost volume 470 may be further averaged across all additional image 415 in embodiments with multiple additional images. In one or more embodiments, the depth estimation model 400 builds a cost volume by concatenating the warped feature maps 455 and the feature map 430 without using differences.

The decoder 490 of the depth estimation model 400 inputs the feature map 430 and the cost volume 470 to generate a depth map 490 for the input image 410. In some embodiments, the skip connection 485 directly feed the feature map 430 to the decoder in the absence of the additional images 415. In one embodiment, the additional image 415 is a temporally nearby (e.g., adjacent) frame to the input image 410 taken from a monocular video. During deployment, the additional image 415 comprises a preceding frame relative to the input image 410, i.e., taken at an earlier time. In other embodiments, the additional images 415 may be temporally nearby frames taken from a binocular video, wherein the warping module 450 factors in relative pose between the two cameras in the camera system capturing the binocular video.

Figure 5:
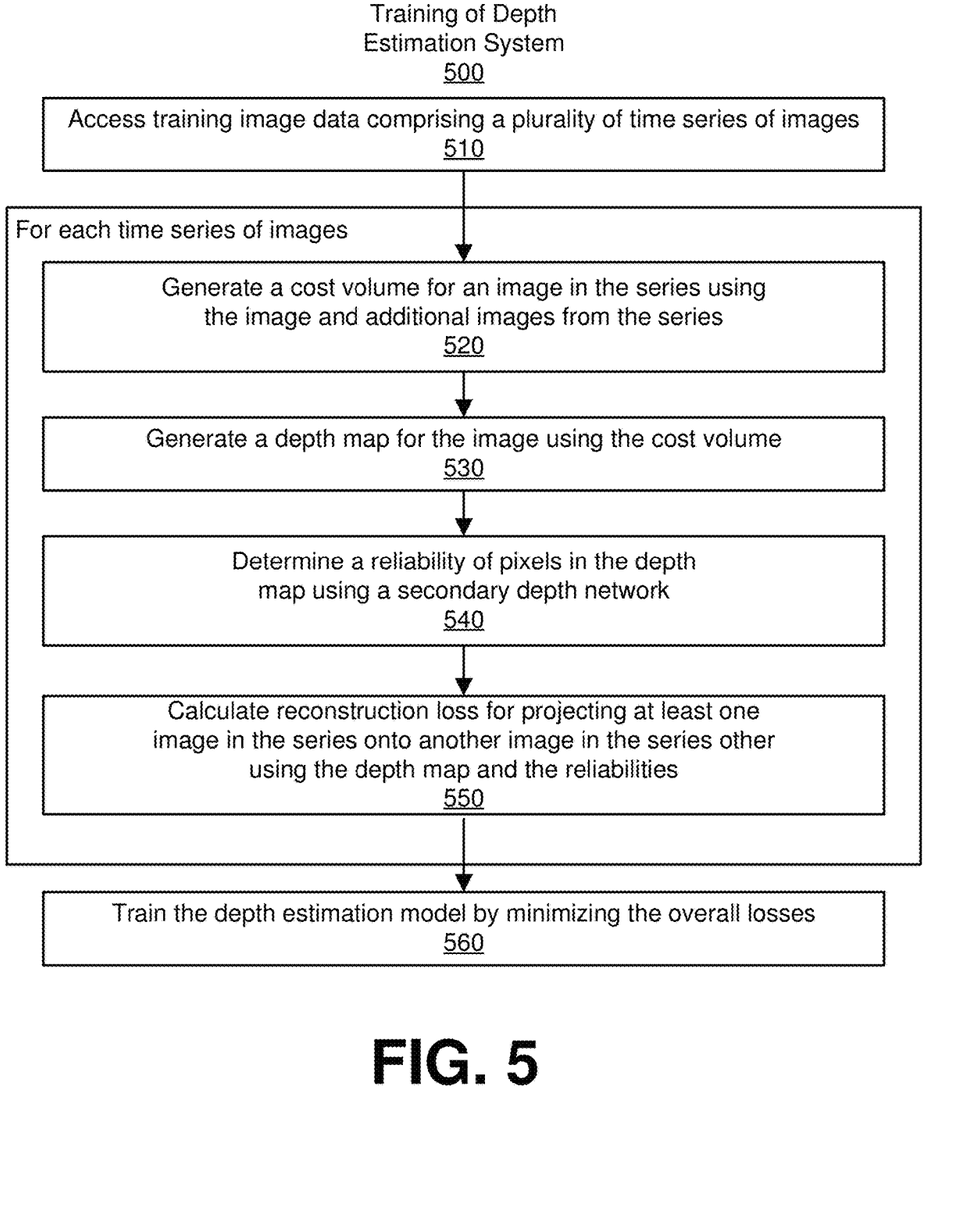
FIG. 5 is a flowchart describing a general process of training a depth estimation model with stereoscopic image data and depth hints, in accordance with one or more embodiments.

FIG. 5 is a flowchart describing a method 500 of training the depth estimation model, in accordance with one or more embodiments. The steps of FIG. 5 are illustrated from the perspective of the depth estimation training system 170 performing the method 500. However, some or all of the steps may be performed by other entities and/or components. In addition, some embodiments may perform the steps in parallel, perform the steps in different orders, or perform different steps.

In the embodiment shown, the depth estimation training system 170 accesses 510 training image data comprising a plurality of time series of images, such as monocular videos. The depth estimation training system 170 performs operations 520-550 for each time series of images.

In processing a given time series of images, the depth estimation training system 170 generates 520 a cost volume for an image in the series and generates 530 a depth map for the image using the model being trained. The cost volume and depth map are generated using both the image and one or more additional images from the time series.

The depth estimation training system 170 determines 540 a reliability of the depth values in the depth map. In one embodiment, the reliability is determined 540 by comparing the values generated by the model being trained to the values generated by a secondary depth network that has been pretrained to estimate depths from a single input image. The secondary network may share a pose network with the model being trained. The reliability may be represented as a binary reliability map that designate each pixel in the depth map as reliable or unreliable. The depth estimation training system 170 calculates a loss for projecting one or more additional images in the time series onto the image using the depth map. The loss may be a function of reconstruction losses and the reliabilities for the pixels.

The depth estimation training system 170 trains 560 the depth estimation model 130 by minimizing the combined loss over the time series. In minimizing the loss, the depth estimation training system 170 may refine parameters of the depth estimation model 130 using backpropagation.

Figure 6:
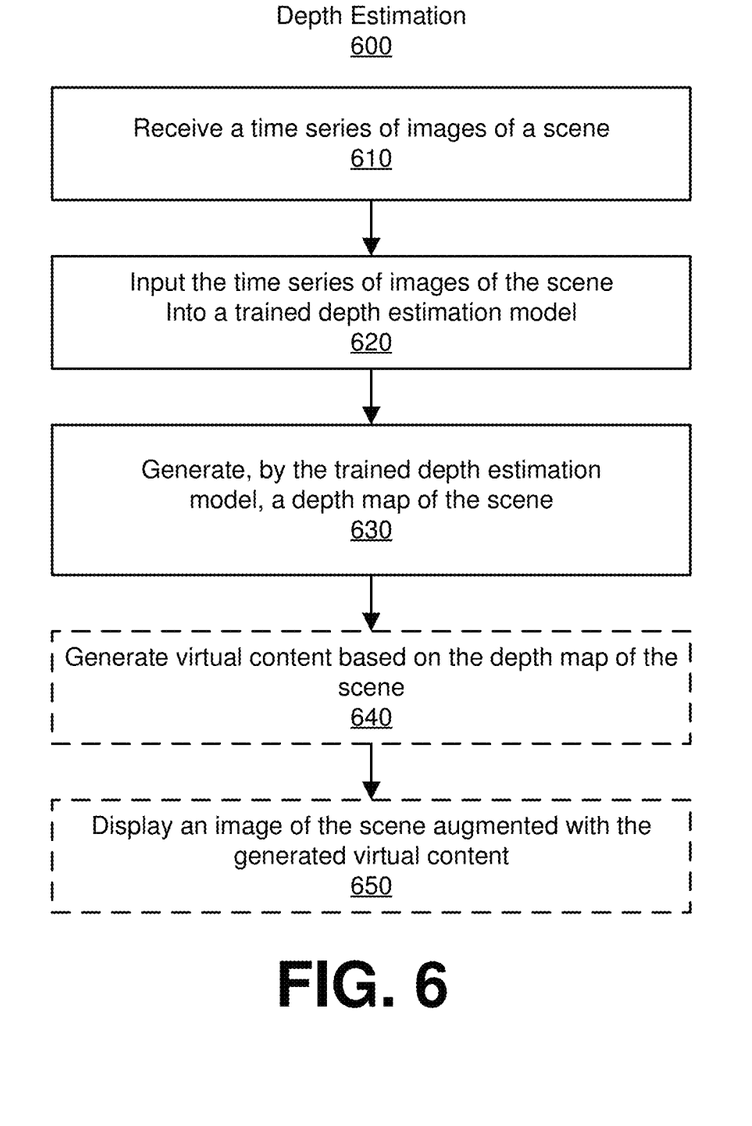
FIG. 6 is a flowchart describing an example use of a depth estimation model trained using depth hints in an augmented reality application, according to one or more embodiments.

FIG. 6 is a flowchart describing a general method 600 of using a depth estimation model 130, in accordance with one or more embodiments. The steps of FIG. 6 are illustrated from the perspective of the client device 110 performing the method 600. However, some or all of the steps may be performed by other entities and/or components. In addition, some embodiments may perform the steps in parallel, perform the steps in different orders, or perform different steps.

The client device 110 receives 610 a time series of images of a scene. The time series of images may be a video captured by a camera of the client device 110 or connected to the client device 110. In the context of the parallel reality game, the scene may be of a real-world location that ma maps to a virtual location in a virtual world.

The client device 110 inputs 620 the series of image of the scene into a trained depth estimation model 130. The depth estimation model 130 may be trained by the depth estimation system 170, e.g., via the process 500 of FIG. 5. The depth estimation model receives the images of the scene and generates 630 a depth map of the scene corresponding to the image of the scene. As noted previously, the depth map may be generated for a current image and the time series of images may be a set of one or more previous images captured by the camera (e.g., one or more previous frames in a video). Each pixel of the depth map has a depth value describing a relative distance of a surface at the corresponding pixel in the image of the scene. The depth estimation receives the image of the scene and outputs the depth map based on the parameters trained for the depth estimation model.

The client device 110 may perform various additional operations with the generated depth map. For example, the client device 110 may be an autonomous vehicle capable of navigating in a real-world environment with the depth map. In another example, the client device 110 is part of an augmented reality system and can present real-world imagery augmented with virtual content. To accomplish this task, the client device 110 may utilize the generated depth map to generate the virtual content, resulting in virtual content interacting at correct depths with objects in the real-world imagery.

In additional embodiments, the client device 110 generates 640 virtual content based on the depth map of the scene. The virtual content can be sourced from content for the parallel reality game, e.g., stored in the game database 115. The virtual content generated may be augmented reality content that can be augmented onto the image of the scene. For example, a virtual character is generated that can move about the scene with understanding of depth of the scene. In one instance, the virtual character can grow in size as the virtual character is walking on a street towards the user. In another instance, the virtual character can duck behind a tree where a portion of the virtual character is then occluded by the tree.

The client device 110 displays 650 the image of the scene augmented with the virtual content. The client device includes an electronic display. The electronic display can provide a constant feed of video captured by the camera with augmented virtual content.

Following the example above, the parallel reality game might provide interacting with the virtual character as an objective. In order to interact with the virtual character, a user of the mobile device may need to move their mobile device around while keeping the virtual character in a field of view of the camera. As the user moves the mobile device around, the mobile device can continually capture video or image data which can be used to iteratively generate depth information of the scene as the scene is changing with the user's movement of the mobile device. The mobile device can update the video feed on the display while also updating the virtual character based on generated depth information so that the user would perceive the virtual character as always interacting appropriately within the scene, e.g., not walking through objects, not having portions that are cut off without any object occluding those portions, etc.

Example Computing System

Figure 7:
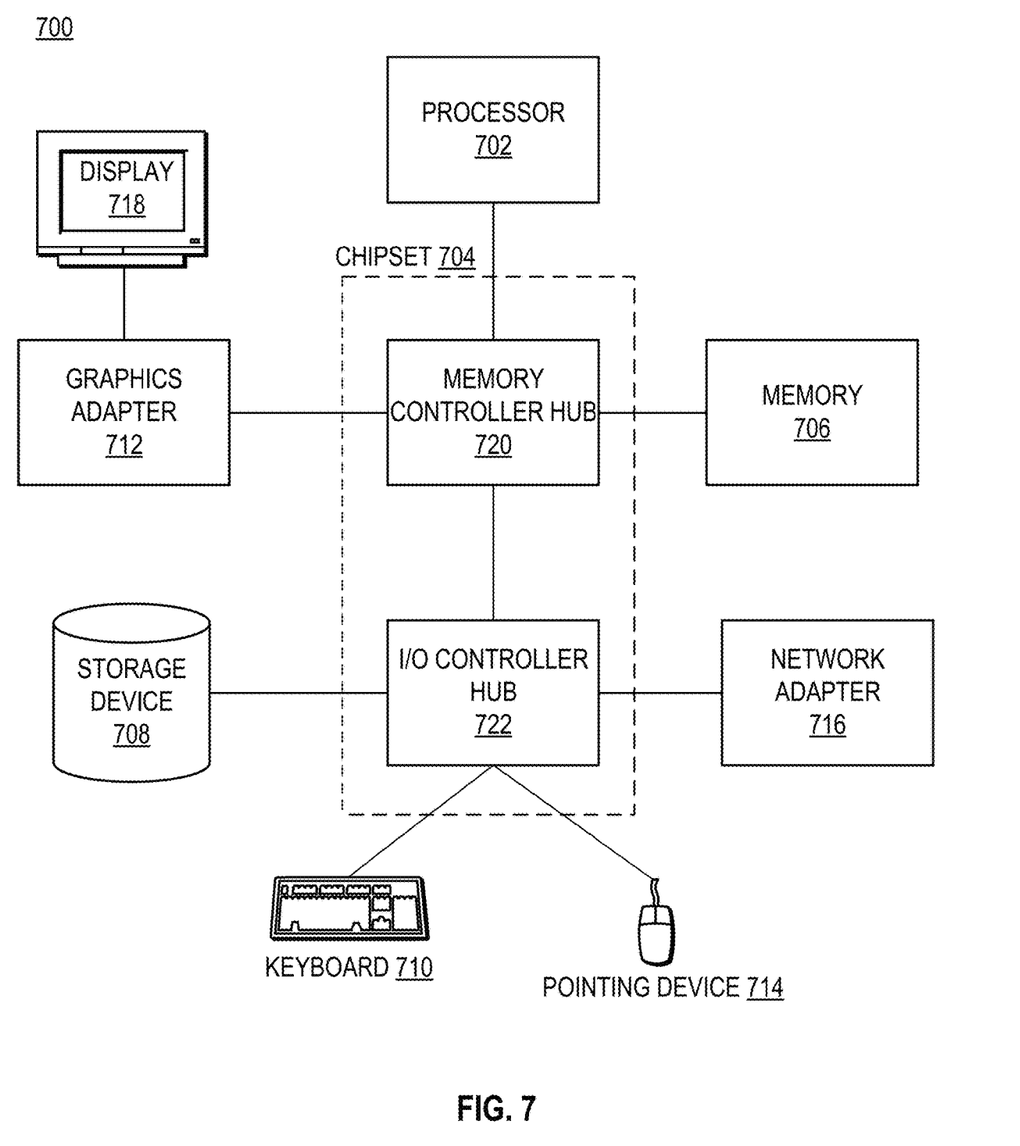
FIG. 7 illustrates an example computer system suitable for use in training or applying a depth estimation model, according to one or more embodiments.

FIG. 7 is an example architecture of a computing device, according to an embodiment. Although FIG. 7 depicts a high-level block diagram illustrating physical components of a computer used as part or all of one or more entities described herein, in accordance with an embodiment, a computer may have additional, less, or variations of the components provided in FIG. 7. Although FIG. 7 depicts a computer 700, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 7 are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O hub 722. In another embodiment, the memory 706 is coupled directly to the processor 702 instead of the chipset 704. In some embodiments, the computer 700 includes one or more communication buses for interconnecting these components. The one or more communication buses optionally include circuitry (sometimes called a chipset) that interconnects and controls communications between system components.

The storage device 708 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 708 can also be referred to as persistent memory. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

The memory 706 holds instructions and data used by the processor 702. The memory 706 can be non-persistent memory, examples of which include high-speed random-access memory, such as DRAM, SRAM, DDR RAM, ROM, EEPROM, flash memory.

As is known in the art, a computer 700 can have different or other components than those shown in FIG. 7. In addition, the computer 700 can lack certain illustrated components. In one embodiment, a computer 700 acting as a server may lack a keyboard 710, pointing device 714, graphics adapter 712, or display 718. Moreover, the storage device 708 can be local or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 708, loaded into the memory 706, and executed by the processor 702.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method comprising:
receiving a time series of images of a scene including a primary image and an additional image from an earlier time than the primary image, wherein the time series of images are monocular images derived from monocular video;
inputting the time series of images into a depth estimation model;
receiving, as output from the depth estimation model, a depth map of the primary image, the depth map generated based on a cost volume concatenating differences between a primary feature map of the primary image and a plurality of warped feature maps of the additional image for each of a plurality of depth planes, wherein receiving the depth map as output from the depth estimation model comprises;
generating a primary feature map for the primary image and an additional feature map for the additional image;
generating a warped feature map comprising a plurality of warped feature map layers, each warped feature map layer generated by warping the additional feature map to a plurality of depth planes based on (1) a depth plane of the plurality to which the feature map is being warped, (2) a relative pose between the primary image and the additional image, and (3) intrinsics of a camera used to capture the primary image and the additional image;
for each warped feature map layer, calculating a difference between the warped feature map layer and the primary feature map; and
building the cost volume by concatenating the differences between layers of the warped feature map and the primary feature map;
wherein the output is based on the cost volume and the primary feature map;
generating virtual content using the depth map; and
displaying an image of scene augmented with the virtual content.

2. The computer-implemented method of claim 1, wherein the relative pose is determined by a convolutional neural network separately trained to determine the relative pose between two images.

3. The computer-implemented method of claim 1, wherein the difference is an absolute difference.

4. The computer-implemented method of claim 1, wherein the depth estimation model is trained by:
tuning a minimum depth plane and a maximum depth plane in the plurality of depth planes.

5. The computer-implemented method of claim 1, wherein the depth estimation model is trained by:
inputting a training secondary image into a secondary depth estimation model to predict an estimated depth of the training secondary image;
generating a binary mask based on the estimated depth;
applying the binary mask to filter out unreliable pixels from the training secondary image; and
training the depth estimation model based on the training secondary image with filtered out unreliable pixels and a training input image.

6. The computer-implemented method of claim 1, wherein the depth estimation model is trained by:
randomly, according to a set probability, replacing a training secondary image with a color augmented version of a training input image; and
training the depth estimation model based on the color augmented version of the training input image compared to the training input image.

7. The computer-implemented method of claim 1, wherein the depth estimation model is trained by:
randomly, according to a set probability, setting a cost volume for a training secondary image to a constant value to generate a blank cost volume; and
training the depth estimation model based on the blank cost volume and a training input image.

8. A non-transitory computer-readable storage medium storing instructions that, when executed by a processor, cause the processor to perform operations comprising:
receiving a time series of images of a scene including a primary image and an additional image from an earlier time than the primary image;
inputting the time series of images into a depth estimation model, wherein the time series of images are monocular images derived from monocular video;
receiving, as output from the depth estimation model, a depth map of the primary image, the depth map generated based on a cost volume concatenating differences between a primary feature map of the primary image and a plurality of warped feature maps of the additional image for each of a plurality of depth planes, wherein receiving the depth map as output from the depth estimation model comprises;
generating a primary feature map for the primary image and an additional feature map for the additional image;
generating a warped feature map comprising a plurality of warped feature map layers, each warped feature map layer generated by warping the additional feature map to a plurality of depth planes based on (1) a depth plane of the plurality to which the feature map is being warped, (2) a relative pose between the primary image and the additional image, and (3) intrinsics of a camera used to capture the primary image and the additional image;
for each warped feature map layer, calculating a difference between the warped feature map layer and the primary feature map; and
building the cost volume by concatenating the differences between layers of the warped feature map and the primary feature map;
wherein the output is based on the cost volume and the primary feature map;
generating virtual content using the depth map; and
displaying an image of scene augmented with the virtual content.

9. The non-transitory computer-readable storage medium of claim 8, wherein the relative pose is determined by a convolutional neural network separately trained to determine the relative pose between two images.

10. The non-transitory computer-readable storage medium of claim 8, wherein the difference is an absolute difference.

11. The non-transitory computer-readable storage medium of claim 8, wherein the depth estimation model is trained by:
tuning a minimum depth plane and a maximum depth plane in the plurality of depth planes.

12. The non-transitory computer-readable storage medium of claim 8, wherein the depth estimation model is trained by:
inputting a training secondary image into a secondary depth estimation model to predict an estimated depth of the training secondary image;
generating a binary mask based on the estimated depth;
applying the binary mask to filter out unreliable pixels from the training secondary image; and
training the depth estimation model based on the training secondary image with filtered out unreliable pixels and a training input image.

13. The non-transitory computer-readable storage medium of claim 8, wherein the depth estimation model is trained by:
randomly, according to a set probability, replacing a training secondary image with a color augmented version of a training input image; and
training the depth estimation model based on the color augmented version of the training input image compared to the training input image.

14. The non-transitory computer-readable storage medium of claim 8, wherein the depth estimation model is trained by:
randomly, according to a set probability, setting a cost volume for a training secondary image to a constant value to generate a blank cost volume; and training the depth estimation model based on the blank cost volume and a training input image.

* * * * *